United States Patent [19]

Murakami et al.

[11] 4,452,522
[45] Jun. 5, 1984

[54] LIQUID CRYSTAL DISPLAY DEVICE FOR CAMERA

[75] Inventors: Hiroyasu Murakami, Tokyo; Takashi Uchiyama; Ryoichi Suzuki, both of Kanagawa; Shinji Sakai, Tokyo; Masaharu Kawamura; Kikuo Momiyama, both of Kanagawa, all of Japan

[73] Assignee: Canon Kabushiki Kaisha, Tokyo, Japan

[21] Appl. No.: 327,617

[22] Filed: Dec. 4, 1981

Related U.S. Application Data

[63] Continuation of Ser. No. 194,445, Oct. 6, 1980, abandoned.

[30] Foreign Application Priority Data

Oct. 9, 1979 [JP] Japan .................................. 54-130272

[51] Int. Cl.³ ...................... G03B 17/18; G03B 13/02
[52] U.S. Cl. ................................. 354/289.12; 354/225
[58] Field of Search ......................... 354/53-55, 354/60 E, 60 L, 155, 166, 219, 224, 225, 289; 350/111, 337, 352, 330; 33/231; 356/8; 339/17 F, 176 MF

[56] References Cited

U.S. PATENT DOCUMENTS

| | | | |
|---|---|---|---|
| 2,554,798 | 5/1951 | Schwartz et al. | 356/8 |
| 4,030,812 | 6/1977 | Strebel | 350/352 X |
| 4,060,889 | 12/1977 | Zielinski | 339/17 F |
| 4,087,829 | 5/1978 | Ueda et al. | 354/60 L X |
| 4,088,400 | 5/1978 | Assculine et al. | 350/337 X |
| 4,104,727 | 8/1978 | Washizuka et al. | 350/337 X |
| 4,114,990 | 9/1978 | Mash et al. | 350/337 |
| 4,140,378 | 2/1979 | Suzuki et al. | 354/53 |
| 4,142,786 | 3/1979 | Suzuki et al. | 354/53 X |

FOREIGN PATENT DOCUMENTS

| | | | |
|---|---|---|---|
| 1076025 | 10/1954 | France | 354/221 |
| 67624 | 6/1977 | Japan | 354/289 |

Primary Examiner—William B. Perkey
Attorney, Agent, or Firm—Toren, McGeady and Stanger

[57] ABSTRACT

A liquid crystal display device for a camera includes a display member having liquid crystal material for providing a display of photographic information, and a focusing glass for forming an image of an object which is to be photographed. A mask is arranged to face the display member and the focusing glass, the mask including a first transparent part which faces a display part of the display member, and a second transparent part which faces the object image formed on the focusing glass. A light shading part is provided between the first and second transparent parts of the mask to shade an end part of the display member from light. The mask enables view finder optics provided in the camera to display a rectangular view field having straight sides to the camera user. This is accomplished by forming boundary lines between the first and second transparent parts and the light shading part of the mask, wherein each boundary line substantially forms an arc having a center located on a straight line which is perpendicular to one of a long and short side of the view field, and which line passes through the center of the view field. The arcuate boundary lines overcome distortion produced by the view finder optics so that they are visually recognized as being straight.

2 Claims, 38 Drawing Figures

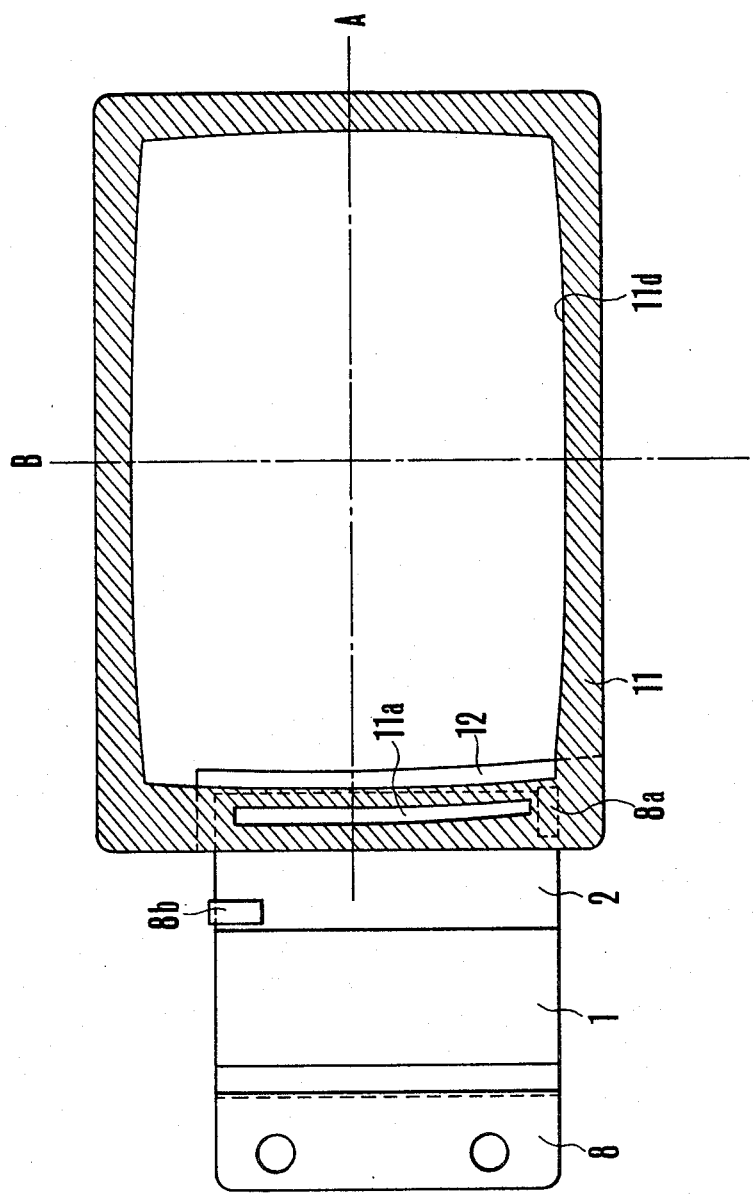

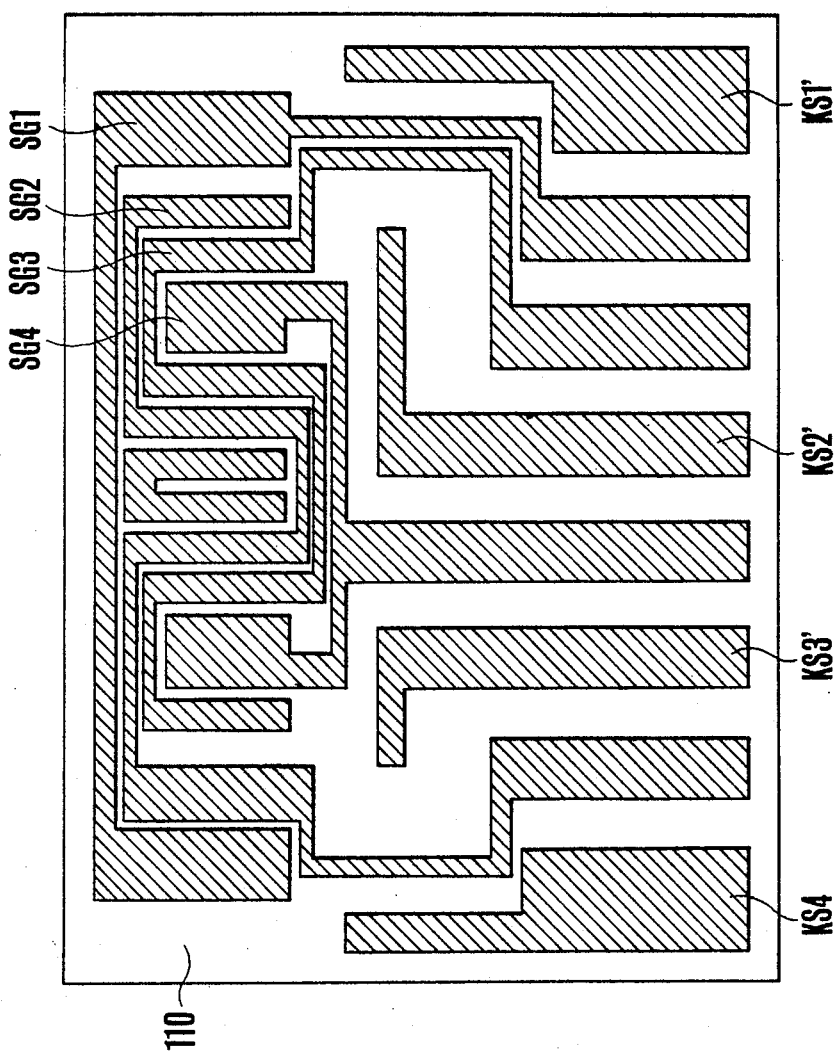

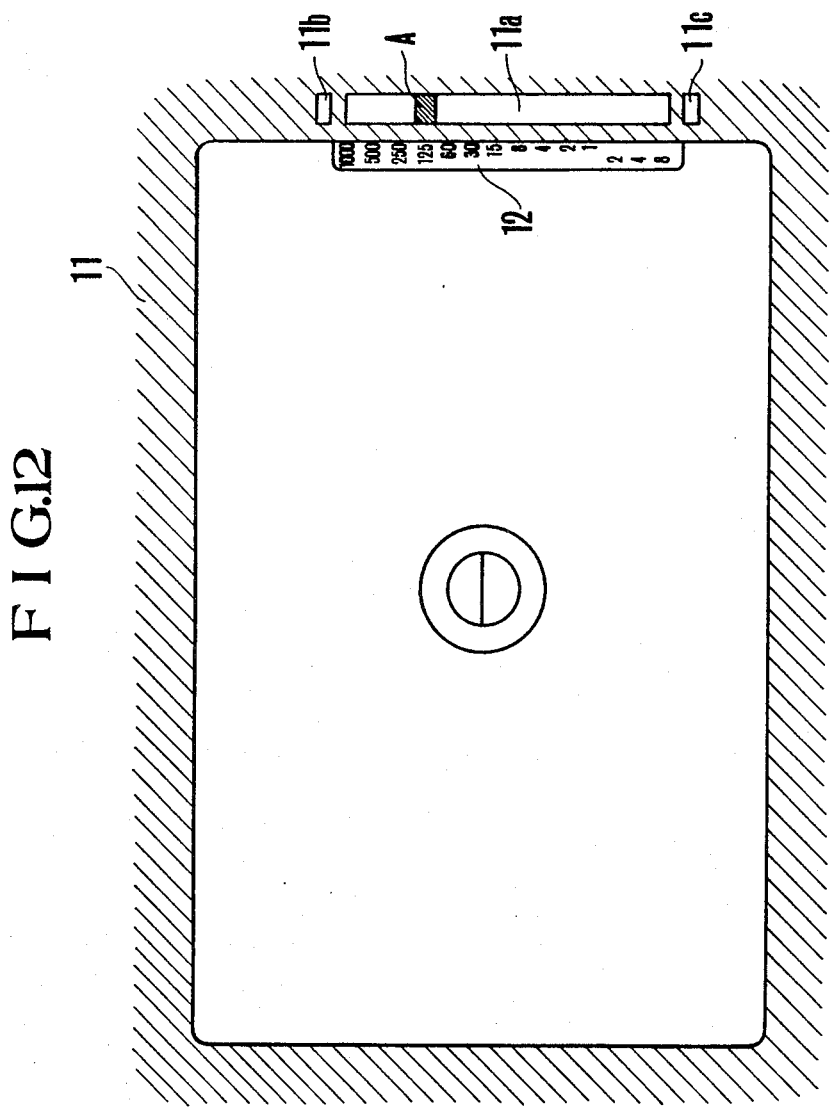

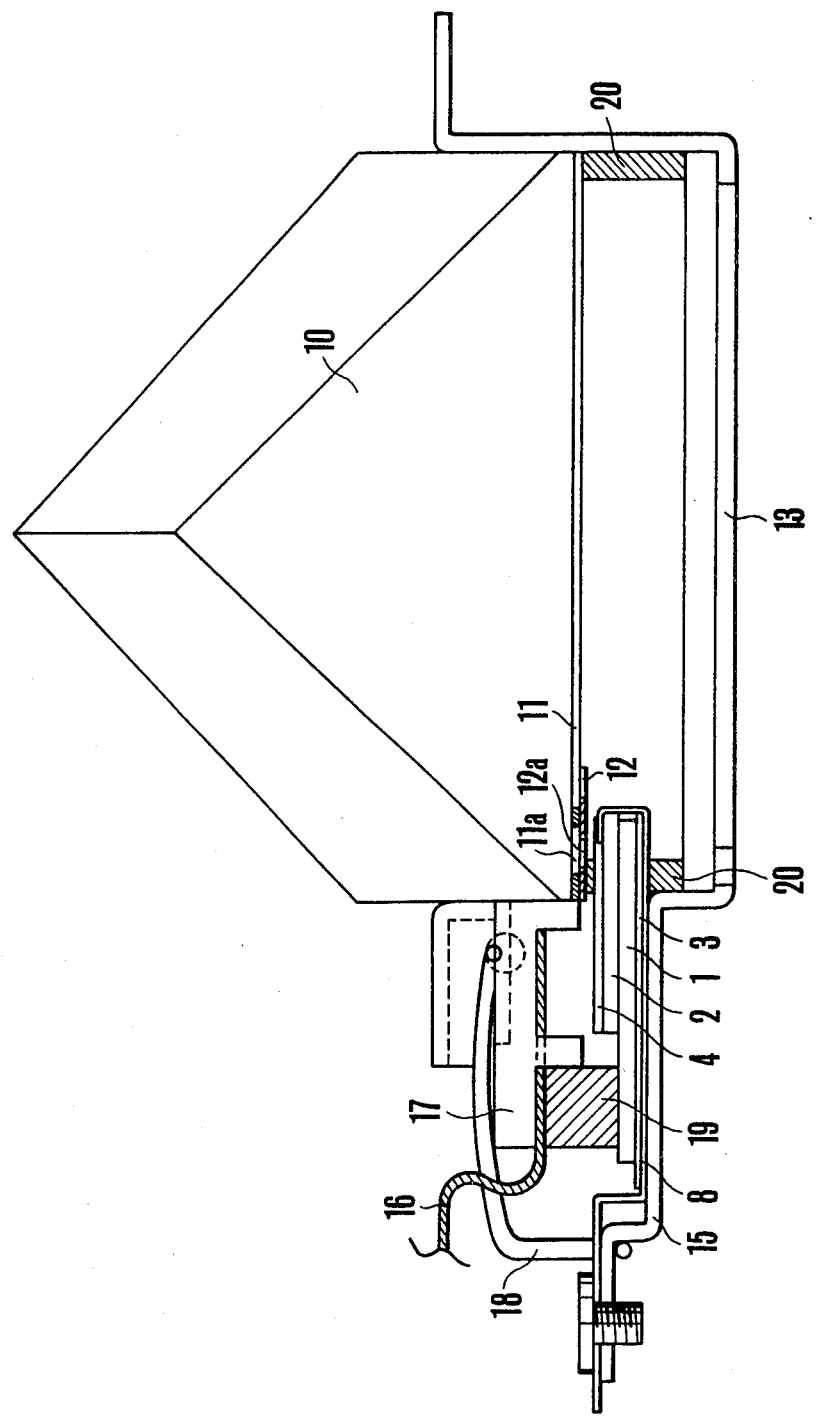

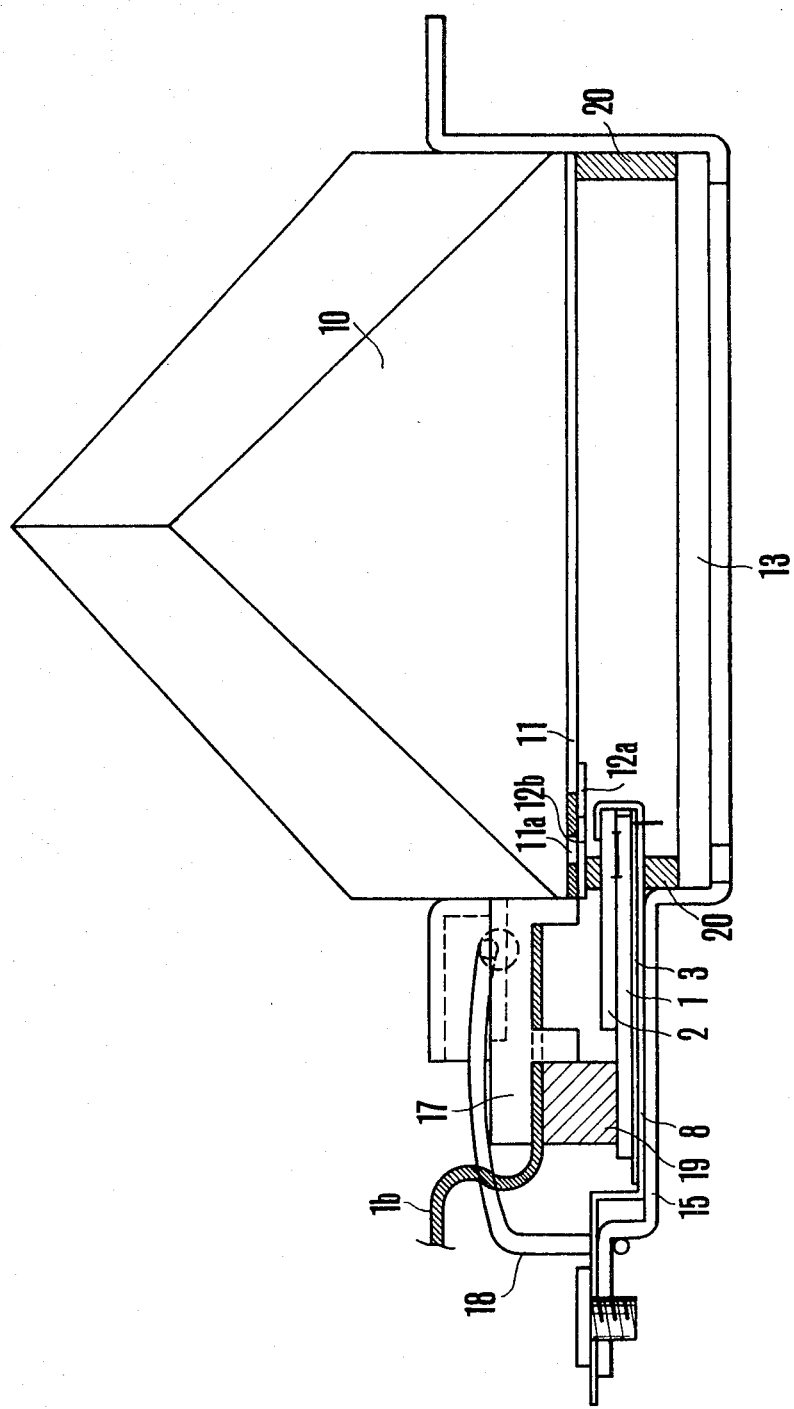

LIQUID CRYSTAL DISPLAY DEVICE FOR CAMERA

This is a continuation of application Ser. No. 194,445, filed Oct. 6, 1980 and now abandoned.

BACKGROUND OF THE INVENTION

1. Field of the Invention

The present invention relates to an improvement of a display device in a single lens reflex camera view finder, arranged so that various photographing information is displayed by means of a liquid crystal display member in the view finder of the camera.

2. Description of the Prior Art

Generally, a display device making use of liquid crystal comsumes little power and can be built economically in a small space, so that it has been widely used as the display for various kinds of the portable appliances (for example, time pieces, desk computer and so on). Further, quite recently, various kinds of information display devices for cameras have been proposed, whereby various photographing information is displayed in the finder view field frame by means of a display device making use of liquid crystal, instead of LED or the like. The reason is that in case the photographing information is displayed by means of liquid crystal in the finder view field frame of the camera, the power consumption can be reduced remarkably in comparison with display devices making use of LED, while the freedom of the display configuration can be widened. In this way, by means of of the liquid crystal display, it is possible to realize a display device suitable for the modern camera which is arranged so that much photographing information can be displayed along the finder view field frame.

However, quite different from an active display by means of LED or the like, a liquid crystal display is a passive display by means of penetrating or reflected light, so that without any illuminating light the display can not be visually recognized. Further, it is necessary that the construction of the liquid crystal display member itself, and the liquid crystal display device including the liquid crystal display member, should be dust-proof, so that many problems occur in the construction of the liquid crystal display device and the mounting of the liquid crystal display device on the view finder optics. Under such circumstances, the present invention is advantageous as will be explained later.

Generally, a display memebr making use of liquid crystal is constructed as is shown in FIGS. 1 and 2. The figures show glass base plates 1, 2 each having a transparent electrode pattern (not shown), and polarization plates 3, 4. The transparent electrode patterns are provided on the planes of the glass base plates 1, 2, whereby liquid crystal matter 6 is sandwiched with proper thickness between the plates. Further, the circumference or perimeter of the liquid crystal matter 6 is sealed by means of a seal portion 5 serving at the same time as a spacer. A display part 7 is arranged so that by applying a voltage between the glass base plates 1 and 2 the polarization angle of the liquid crystal is varied so as to produce a display pattern. In this kind of liquid crystal display member it is necessary to hold the liquid crystal matter 6, maintain the width of the seal portion larger than a certain determined value in order to protect the liquid crystal member itself, and shade the seal portion 5 in order to obtain a clear display pattern from the light. For this reason, in the conventional liquid crystal display device in which the above mentioned liquid crystal display member is built in the finder view field frame without accomodating the width of the seal portion 5, the finder view field frame is too distant from the display part of the liquid crystal display member to obtain a clear display of various photographing information and a high view field ratio of the finder.

SUMMARY OF THE INVENTION

An object of the present invention is, in order to overcome the above-mentioned shortcomings, to offer a display device for a camera arranged so that the view field frame of the finder is shaped in accordance with the distortion produced in the finder optics so as to obtain a wide view field ratio and a pleasing appearance of the display information, and to realize a most suitable assembly for constructing the liquid crystal display device which displays various photographing information by incorporating a liquid crystal display member in the view finder optics of the camera.

Another object of the present invention is to offer a liquid crystal display device in the view finder optics of a camera, arranged so that the display form or the display color are varied in accordance with the kind of the information to be displayed, so as to obtain better visualization of the display.

Further, another object of the present invention is to offer a novel construction for a polarization plate to be mounted in the liquid crystal member for the liquid crystal display device in the finder optics, so as to obtain better visualization of the display.

Other objects of the present invention will become obvious from the explanation to be made later in accordance with the accompanying drawings of the embodiments.

BRIEF DESCRIPTION OF THE DRAWINGS

FIG. 4 shows a part of the liquid crystal display device shown in FIG. 3 in enlarged view.

FIG. 12 shows an embodiment of the visible pattern of the liquid crystal display device in accordance with the present invention in plane view.

FIG. 14 and FIG. 15 show the essential part of the view finder of the single lens reflex camera having a built in liquid crystal display device in another embodiment.

DESCRIPTION OF THE PREFERRED EMBODIMENTS

Figure 1:
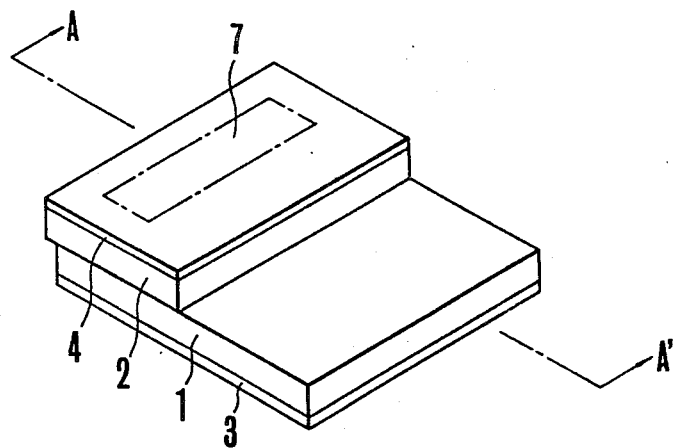
FIG. 1 shows an embodiment of a display device making use of liquid crystal in perspective view.
Figure 3:
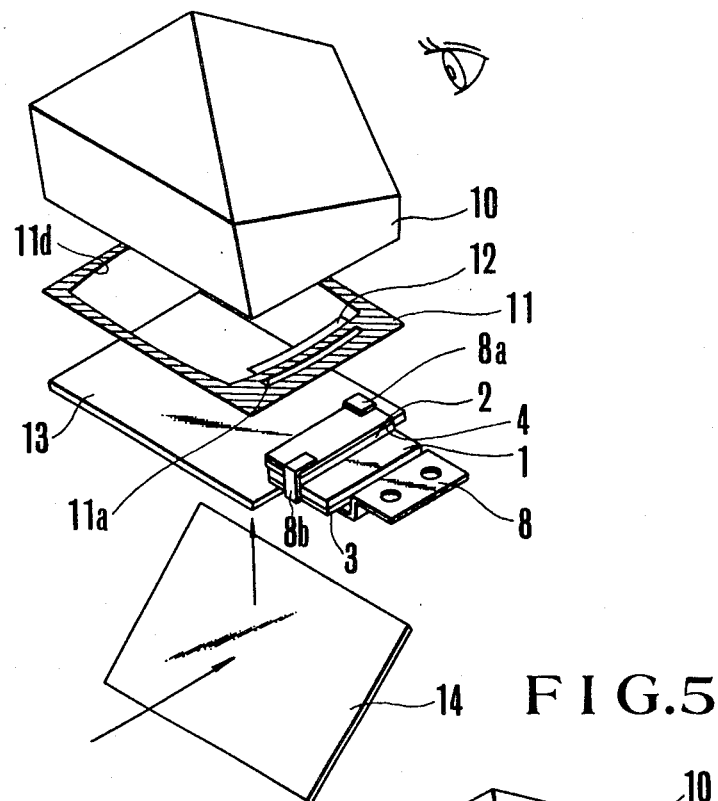
FIG. 3 shows an embodiment of the liquid crystal display device in accordance with the present invention arranged in the view finder optics in perspective view.

Below, the present invention will be explained in accordance with the accompanying drawings of the embodiments. FIG. 3 shows members 1–4 corresponding to the same numbered members in FIG. 1, and a fixing member 8 of the liquid crystal display member, whereby a liquid crystal display device is positioned by means of a claw part 8a and secured by means of claws 8a and 8b. Further, the fixing member 8 is provided on a pentagonal prism holder, not shown in the drawing, by means of a screw. FIG. 3 also shows a pentagonal prism 10 and a view field mask 11. A view field frame lid for forming the finder view field has a light shading boundary. In order to compensate the finder view field, the boundary forms a curve almost similar to an arc having a center on a straight line passing through the center of the photographing view field perpendicular to the long or the short side of the view field, which curve is visually recognized as a straight line in the view finder. Further, by means of the curved strip portion between the boundary of the view field frame 11d and the liquid crystal window 11a, the straight end portion of the liquid crystal member and the seal portion 5 can be covered. A display scale 12 bears the figures, marks or the like for the shutter time, the aperture value and other photographing information. Thus, the indication figures or marks can be read in the view finder. Also provided is a focusing glass 13 and a quick return reflecting mirror 14.

Figure 5:
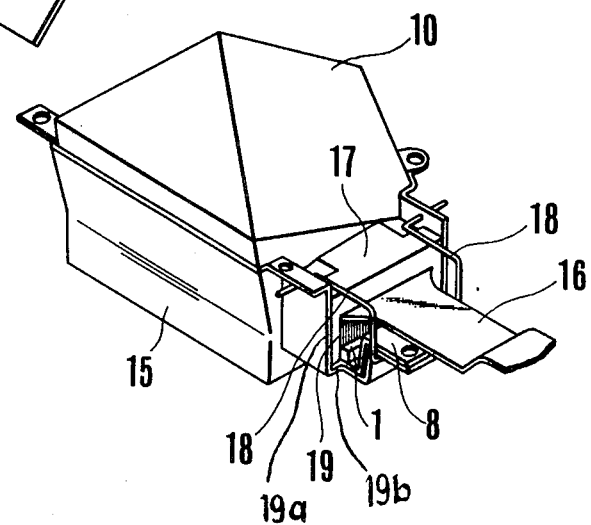
FIG. 5 shows the liquid crystal display device arranged in the view finder optics so as to constitute the liquid crystal display device in accordance with the present invention in perspective view.
Figure 6:
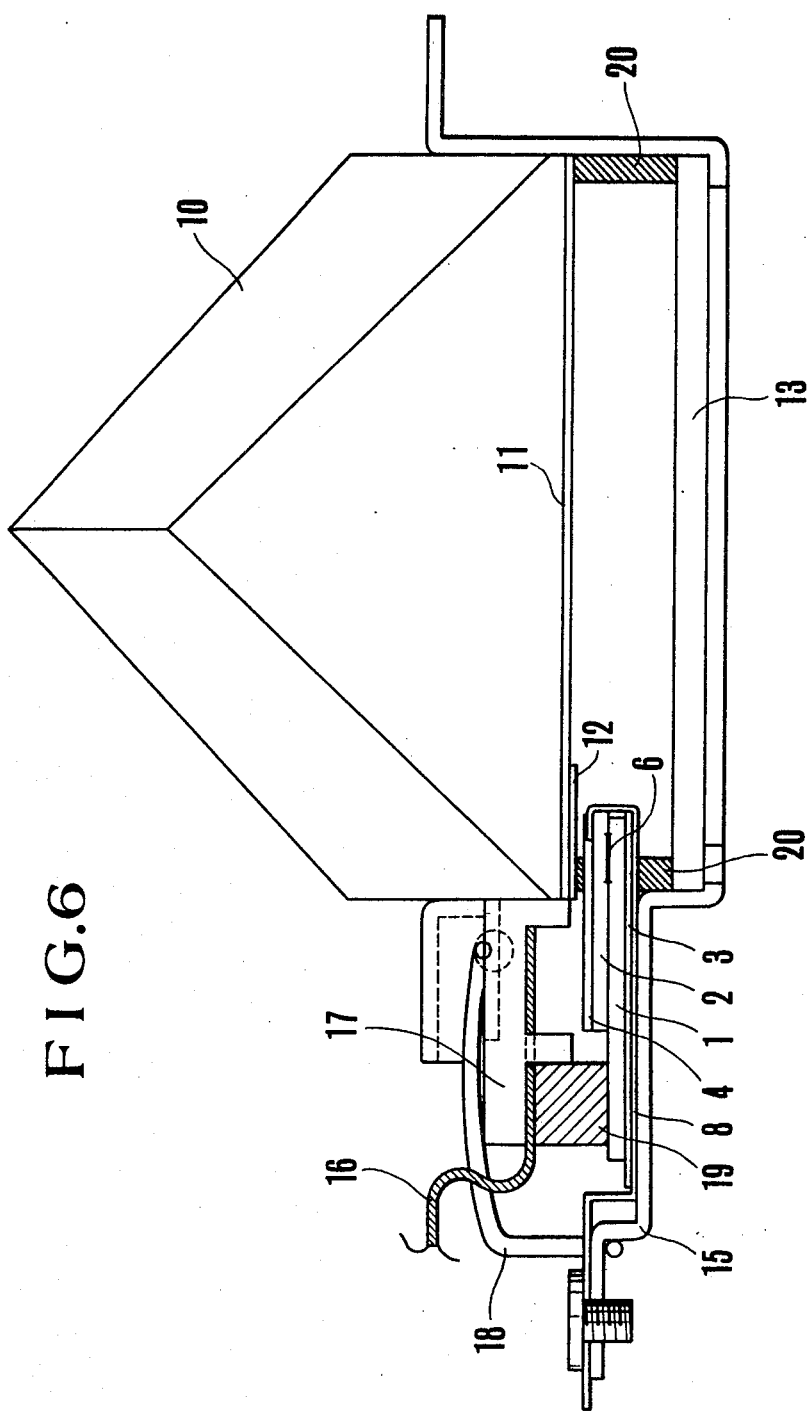
FIG. 6 shows the essential construction of a single lens reflex camera with the built in liquid crystal display device in accordance with the present invention.

In the arrangement of FIGS. 3, 5 and 6, the light shading mask 11, having the display window 11a and the finder view field frame 11d, is provided in the view finder optics, for example, in the neighborhood of the light incident plane of the pentagonal prism 10. In the event the object image formed on the focusing glass through the plane of the light shading mask 11 is distorted by means of a Fresnel lens, a condenser lens or the like constituting a focusing glass, it is recommended that a distortion of the same amount be given to the finder view field frame 11d and the display window 11a, in order that the finder view field frame 11d and the display window 11a can be visualized as straight through the finder optics, because the above distortion is compensated in the optics between the pentagonal prism 10 and the eye piece lens. Further, the image formed on the focusing glass 13 can be seen as a standing image through the view finder optics.

FIG. 4 shows a part of FIG. 3 seen from the upper surface of the view field mask 11 in enlarged plane view. In the drawing, those members with same reference figures as those in FIG. 3 are the same members. Although the boundary of the finder view field frame 11d around the view field mask 11 is arc-shaped, the end plane of the base plate of the liquid crystal display member (hereinafter called liquid crystal base plate end plane) is straight. Therefore, the closer to a diagonal corner of the view field, the greater the distance between the arc part of the boundary and the liquid crystal base plate end plane, so that this forms a dead space. Obtaining an arc-shaped liquid crystal base plate end plane by grinding entails an increase of the manufacturing cost of the liquid crystal display member. Further, from the view point of a pleasing visual display, it is better that the distance between the indication scale 12 and the indication window 11a be small. Consequently, in accordance with the present invention as is shown in the drawing, the claw part 8a for the fixing of the base plate is provided not in the neighborhood of the center line A of the view field, but in the neighborhood of a diagonal corner of the finder view field frame 11d, so that the above dead space can be efficiently used. As shown in the drawing, the claw part 8a for the fixing of the base plate enables a display device of a pleasing appearance to be obtained, without making the distance between the display scale 12 and the display window 11a relatively large.

Further, regarding the display window 11a, the part which bears the display scale 12, and not the view field mask 11, is given a light shading ability, while other parts are made transparent.

FIGS. 5 and 6 show an example of the connection of the liquid crystal display device to its driving circuit in perspective and in side view. In the drawing, members having the same figures as those in preceding drawings are the same members. FIGS. 5 and 6 show a pentagonal prism holder 15, which is secured on a camera body, not shown in the drawing, a flexible printed circuit 16 which serves as a connecting cable to the driving circuit, not shown in the drawing, a connector rubber presser 17 for holding a conductive connector rubber 19 from two sides. (The conductive part and the non-conductive part are constructed as one body so as to be fitted to the pitch of the connector.) Presser 17 is urged toward the pentagonal prism holder 15 and the pentagonal prism 10 so as to prevent the invasion of the rubber and so on. (In order to obtain complete dust-proofness, it is sufficient to seal the contact parts or the boundaries of the pentagonal prism holder 15, the connector rubber presser 17, the pentagonal prism 10 etc. by means of silicone rubber of the like). Also shown is a connector spring 18 supported on the pentagonal prism holder 15 so as to press the connector rubber presser 17 toward the liquid crystal base plate in such a manner that the flexible printed plate 16, the connector rubber 19 and the liquid crystal base plate 1 form conductive paths. A spacer 20 is provided between the pentagonal prism 10 and the focusing glass 13.

FIGS. 7(a) and (b) show an example of the base plate of the liquid crystal display member, for a dot system display in accordance with the present invention, in plane view. FIG. 7(a) shows the construction of the transparent electrode formed on one transparent glass base plate 110, including transparent segment electrodes SG1-SG4 and transparent electrodes KS1'-KS4'. These transparent electrodes consist of, for example, $In_2O_3$ doped with $SnO_2$, having a conductivity and metallized on the above transparent glass base plate 110.

Figure 7B:
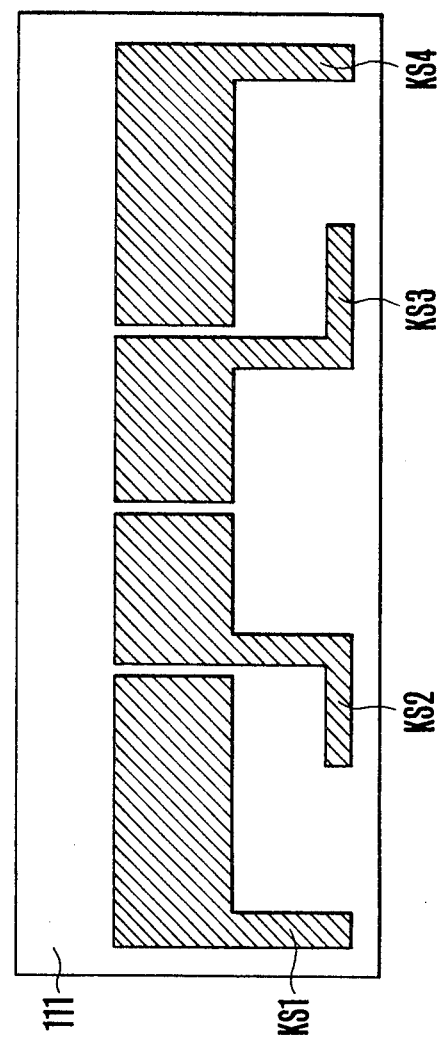
FIGS. 7(a) and (b) respectively show the transparent electrode pattern of the liquid crystal display member for the liquid crystal display device in accordance with the present invention in plane view.
FIG. 7(c) shows the base plates shown in FIGS. 7(a) and (b) in an assembled state in perspective view.

FIG. 7(b) shows the construction of the transparent electrode formed on the other transparent glass base plate 111 including common transparent electrodes KS1-KS4. These common transparent electrodes are also metallized on the transparent glass base plate 111, consisting of $In_2O_3$ doped with $SnO_2$ and having a conductivity.

Figure 2:
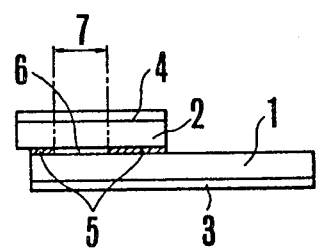
FIG. 2 shows the section along A—A' in FIG. 1.
Figure 7C:
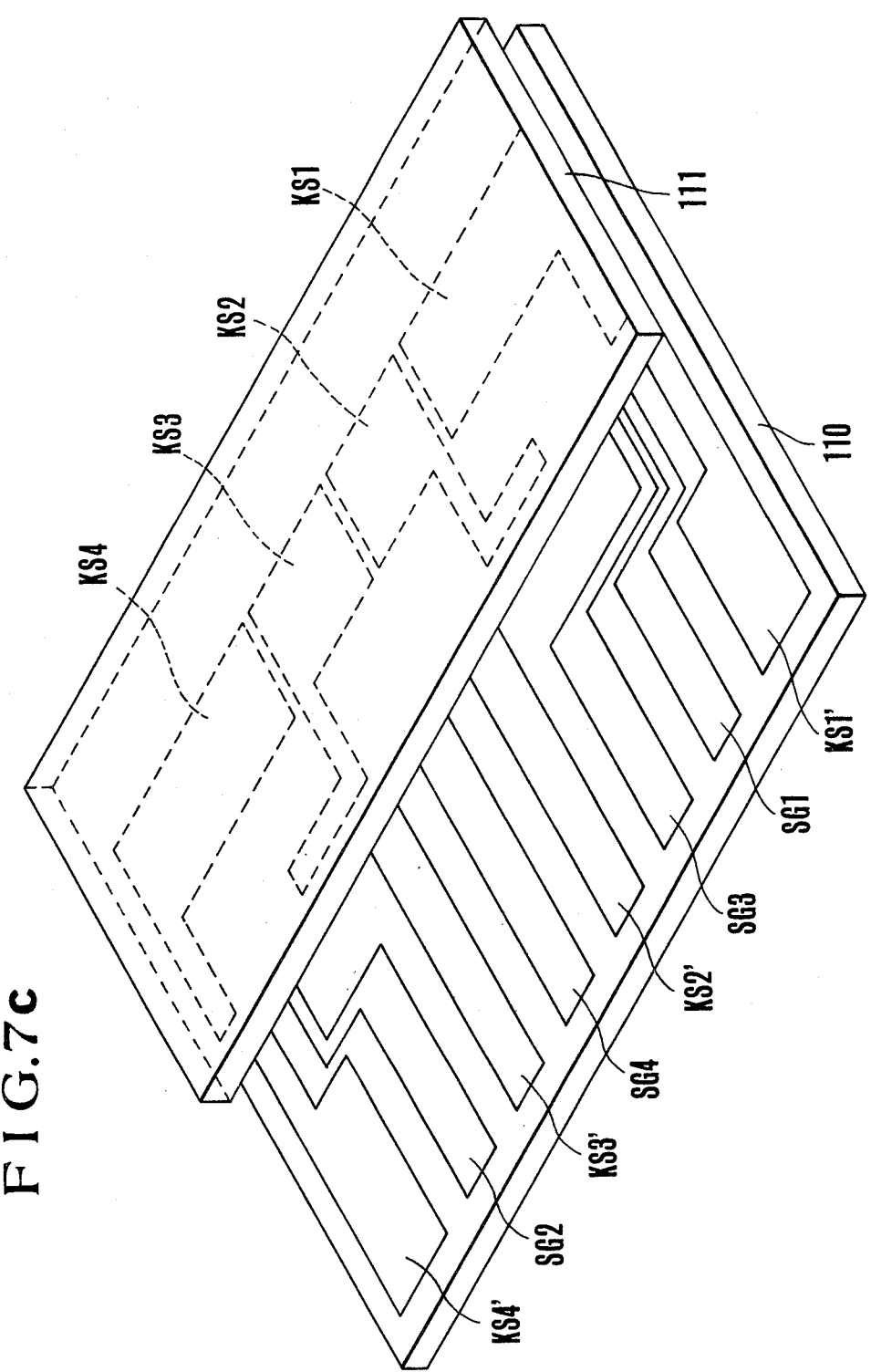

FIG. 7(c) shows the glass base plates 110 and 111 shown in FIGS. 7(a) and (b) facing each other in perspective view. In order to obtain a complete liquid crystal display device, as is shown in FIG. 2, the liquid crystal matter is filled between the transparent base plates 110 and 111 facing each other, whereby it is necessary to cover the opening formed around the circumference or perimeter by means of the seal part which serves as a spacer. Further, in order to give a pleasing appearance to the display pattern, it is necessary to arrange two polarization plates so as to sandwich the transparent glass plates 110 and 111, which arrangement is omitted in the drawing.

Further, in FIG. 7(c) the transparent electrodes KS1'-KS4' on the base plate 110 are electrically connected to the common transparent electrodes KS1-KS4 on the base plate 111 through a connector which is not shown in the drawing. Being constructed as mentioned above, the connection of the liquid crystal dislay member with the driving circuit can be carried out at one end of the transparent glass base plate 110, which is very convenient in practice.

Figure 8:
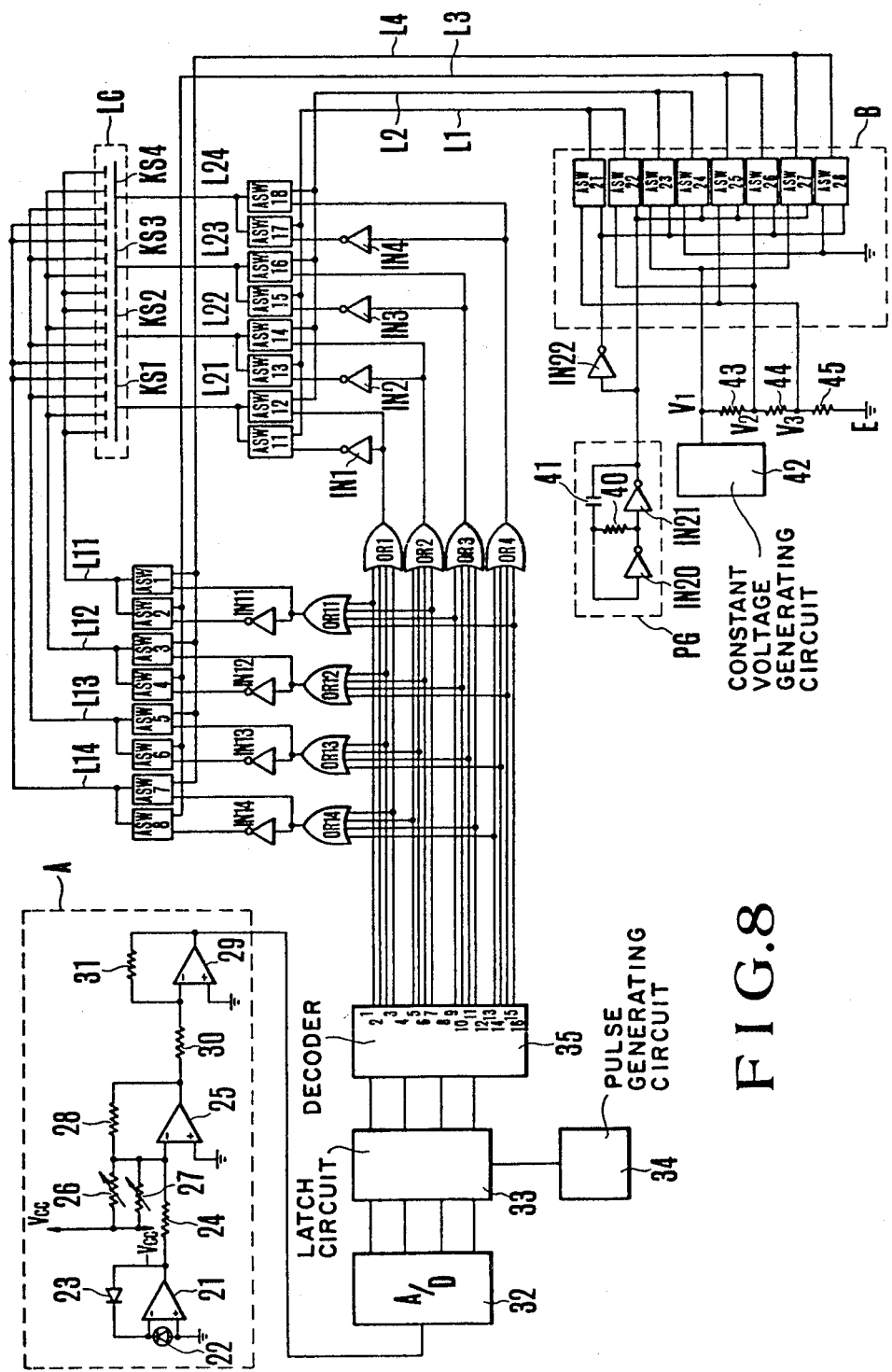
FIG. 8 shows an embodiment of a driving circuit of the liquid crystal display device in accordance with the present invention.

FIG. 8 shows an embodiment of a driving circuit for driving the liquid crystal dislay member shown in FIG. 7(c). The figure shows a light measuring calculation circuit A including an operational amplifier 21 constituting an SPC head amplifier, the SPC (silicone photocell) 22 connected to both input terminals of the operational amplifier, and a logarithmically compressing diode 23 connected in a negative feed back circuit, and an operational amplifier 25 constituting an adder, whose non-inverting input terminal is grounded and whose inverting input terminal is connected to the output of the operational amplifier 21 through a resistance 24. Also shows are variable resistors 26, 27 for setting the film ASA sensitivity information and the preset aperture value information, a resistor 28 inserted in the negative feed back circuit of the operational amplifier 25, an operational amplifier 29 constituting an inverting amplifier, whose non-inverting input terminal is grounded and whose inverting input terminal is connected to the output of the operational amplifier 25 through a resistor 30, a negative feed back resistor, an A/D converter 32, which converts the analogue output voltage of the operational amplifier 29 into a 4 bit binary code, and a latch circuit 33 for latching the 4 bit input binary code in accordance with the pulse output of a pulse producing circuit 34. The latching time is set at, for example, about 0.5 sec. A decoder 35 converts the 4 bit binary code into a decimal code. FIG. 8 also shows four input OR gates OR1-OR4, whereby the OR gate OR1 is connected to the outputs 1-4 of the decoder 35, OR2 to the outputs 5-8, OR3 to the outputs 9-12 and OR4 to the outputs 13-16, and OR gates OR11-OR14, whereby the OR gate OR11 is connected to the outputs 1, 8, 9 and 16 of the decoder, OR12 to the outputs 2, 7, 10 and 15, OR13 to the outputs 3, 6, 11 and 14 and OR14 to the outputs 4, 5, 12 and 13.

Inverting circuits IN1-IN4 are connected to the outputs of the OR gates OR1-OR4, and inverting circuits IN11-IN14 are connected to the outputs of the OR gates OR11-OR14. Also shown is an analogue switch group ASW1-ASW8, whereby the control inputs of ASW1, ASW3, ASW5 and ASW7 are connected to the outputs of the OR gates OR11-OR14. Further, the control inputs of the analogue switches ASW2, ASW4, ASW6 and ASW8 are connected to the outputs of the inverting circuits IN11-IN14. FIG. 8 further shows an analogue switch group ASW11-ASW18, whereby the control inputs of ASW11, ASW13, ASW15 and ASW17 are connected to the outputs of the inverting circuits IN1-IN4. Further, the control inputs of the analogue switches ASW12, ASW14, ASW16 and ASW18 are connected to the outputs of the OR gates OR1-OR4. A constant voltage producing circuit 42 has, at its output, voltage dividing resistors 43, 44 and 45 of the same value connected in series. Now, let the output the constant voltage producing circuit 42 be V1, the voltage at the connecting point of the resistors 43 and 44 be V2, the voltage at the connecting point of the resistors 44 and 45 be V3, and the earth or ground level be E.

An inverting circuit IN 22 is connected to the output of the pulse producing circuit PG. The frequency of the repetition of the output of the pulse producing circuit PG is set at, for example, 200 Hz. FIG. 8 also shows a liquid crystal driving wave form producing circuit B, and an analogue switch group ASW21-ASW28, whereby the inputs of ASW21 and ASW25 are connected to the voltage dividing point V3 of the voltage dividing resistors 44 and 45, the inputs of ASW22 and ASW26 to the voltage dividing point V2 of the voltage dividing resistors 43 and 44, the input of ASW23 and ASW27 to the output V1 of the constant voltage producing circuit 31, and the inputs of ASW24 and ASW28 to the earth level E. The control inputs of ASW22, ASW24, ASW25 and ASW27 are connected to the outputs of the above pulse producing circuit PG, and the control inputs of ASW21, ASW23, ASW26 and ASw28 to the output of the inversing circuit IN22. Further, the outputs of ASW21 and ASW22 are connected to inputs of ASW11, ASW13, ASW15 and ASW17, and the outputs of ASW23 and ASW24 to inputs of ASW12, ASW14, ASW16 and ASW18. Also, the outputs of ASW25 and ASW26 are connected to inputs of ASW2, ASW4, ASW6 and ASW8, and the outputs of ASW27 and ASW28 to inputs of ASW1, ASW3, ASW5 and ASW7.

FIG. 8 further shows the above liquid crystal display device LC, whereby among the common electrodes KS1-KS4 provided on one base plate of LC, KS1 is connected to the two outputs of ASW11 and ASW12, KS2 to the two outputs of ASW13 and ASW14, KS3 to the two outputs of ASW15 and ASW16, and KS4 to the two outputs of ASW17 and ASW18.

Further, among the segment electrodes SG1-SG4 provided on the other base plate of the above liquid crystal display member, SG1 is connected to the two outputs of ASW1 and ASW2, SG2 to the two outputs of ASW3 and ASW4, SG3 to the two outputs of ASW5 and ASW6, and SG6 to the outputs of ASW7 and ASW8.

Figure 9A:
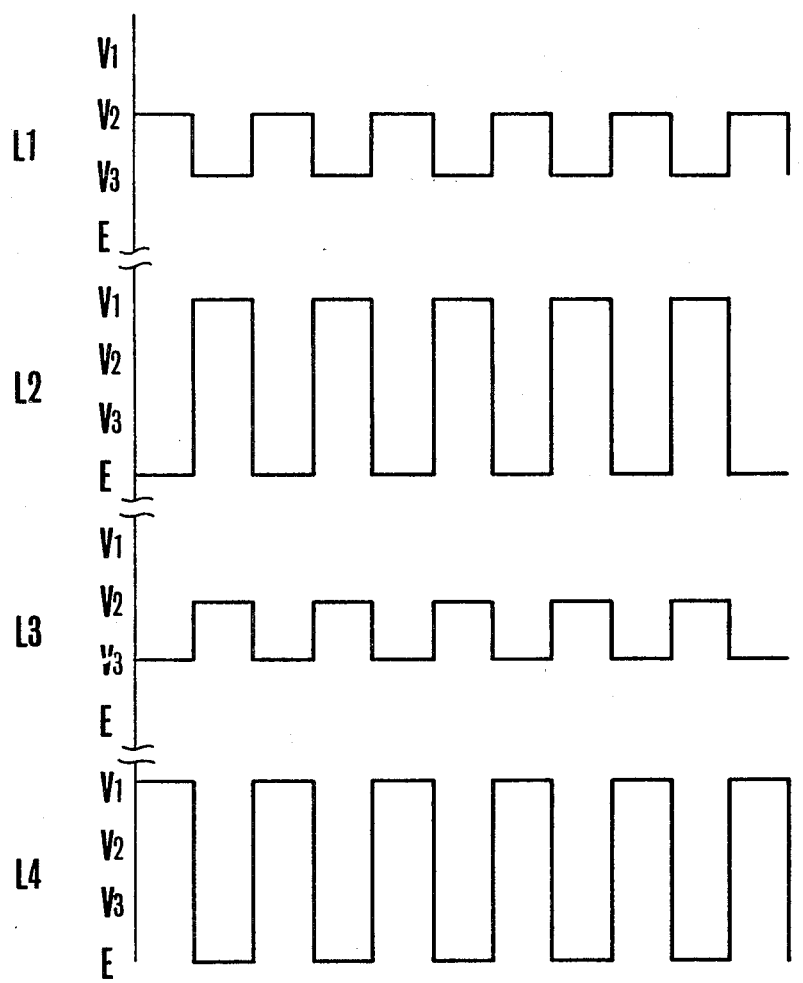
FIGS. 9(a), (b), (c) and (d) show timing charts for showing the wave forms at various parts of the driving circuits shown in FIG. 8.
Figure 9B:
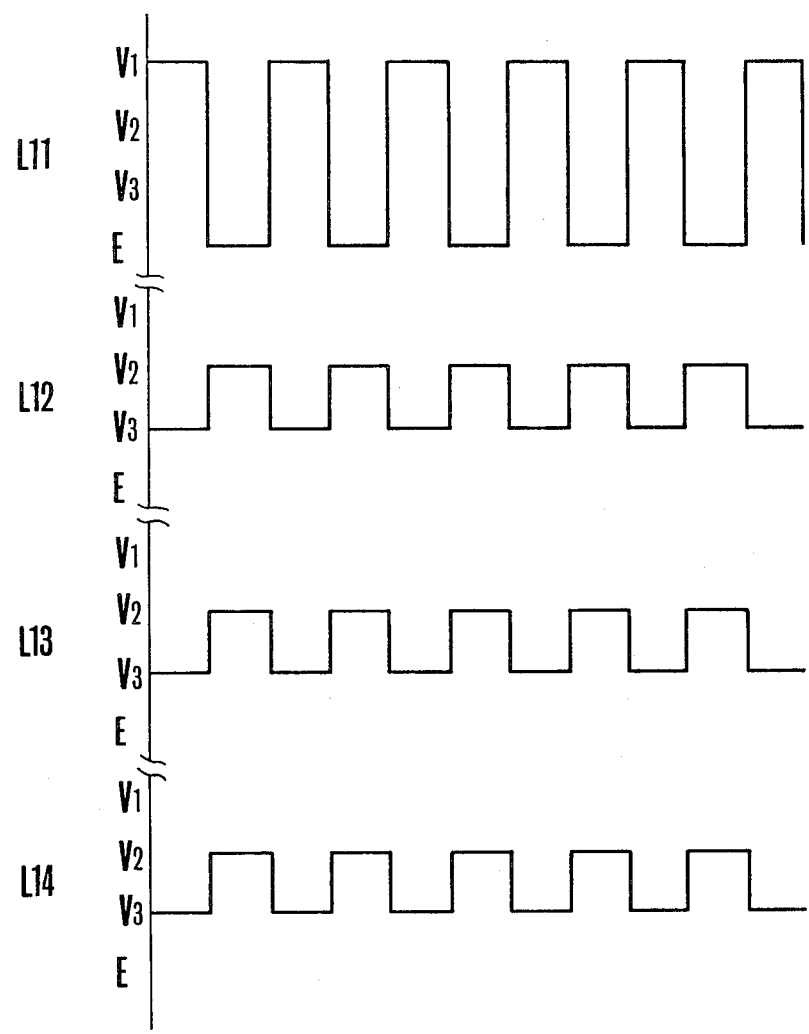
Figure 9C:
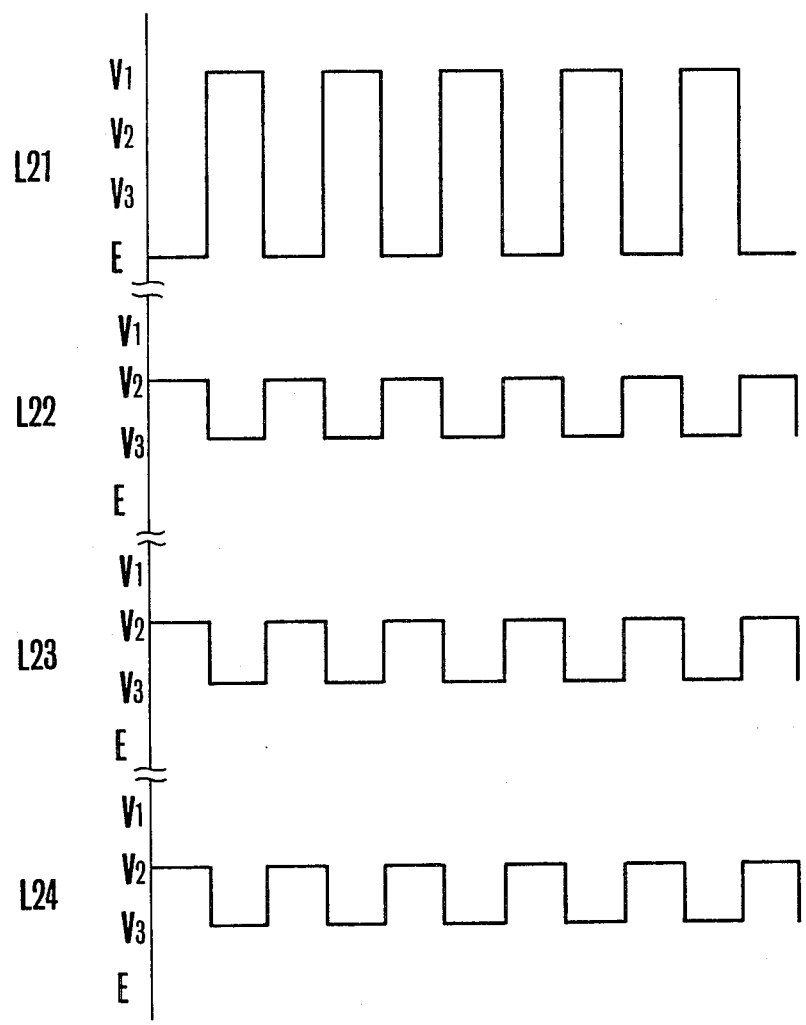

Below, the operation of the circuit constructed as mentioned above will be explained. The output pulse voltage from the pulse producing circuit PG is applied to the control input terminal of ASW22, ASW24, ASW25 and ASW27, while a pulse voltage of reversed phase to the above pulse voltage is applied to the control input terminal of ASW21, ASW23, ASW26 and ASW28, so that the pulse voltage existing on the output lines L1-L4 from ASW21-ASW28 is as shown in FIG. 9(a). Now let us suppose that the outut of the latch circuit 33 is [0001], while the output 1 of the decoder 35 is selected (high level). At this time, only the level of the output 1 of the decoder is high, while other levels are all low, so that the level of OR1 and OR11 are high, while the levels of OR2-OR4 and OR12-OR14 remain low. Consequently, the level of the outputs of IN1 and IN11 becomes low, while that of the outputs of IN2-IN4 and IN12-IN14 become high. In this state, out of the analogue switch group ASW1-ASW8, ASW1, ASW6 and ASW8 are closed in such manner that pulse voltages, as is shown in FIG. 9(b), exist on the output lines L11-L14. Further, out of the analogue switch group ASW11-ASW18, ASW12, ASW13, ASW15 and ASW17 are closed in such manner that pulse voltages, as is shown in FIG. 9(c), exist on the output lines L21-L24.

Figure 9D:
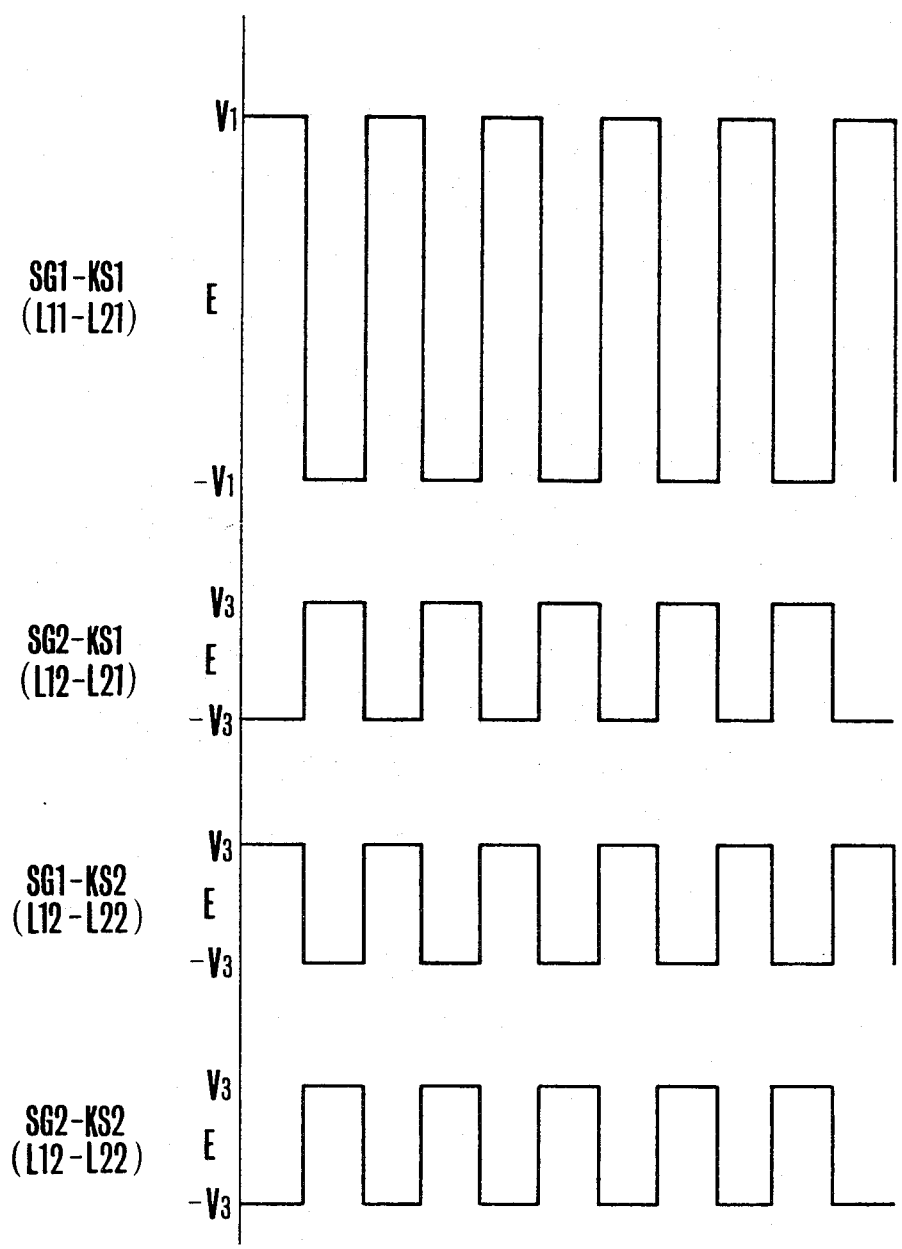

FIG. 9(d) shows the pulse wave forms applied between the segments on the liquid crystal display device LC in the above state. As is clear, from the drawings, in accordance with this driving system, the effective value of only the pulse voltage applied between the segment electrode SG1 and the common electrode KS1 is V (hereby V1=V volt), while that of the pulse voltages between other segment electrodes and the common electrode is ⅓ V. In case the value of V is adjusted in such a manner that V/3<Vth<V, whereby Vth is the threshold voltage of the liquid crystal, only the liquid crystal between the segment electrode SG1 and the common segment KS1 is in the switched on state, while other liquid crystals are in the switched off state.

Figure 10A:
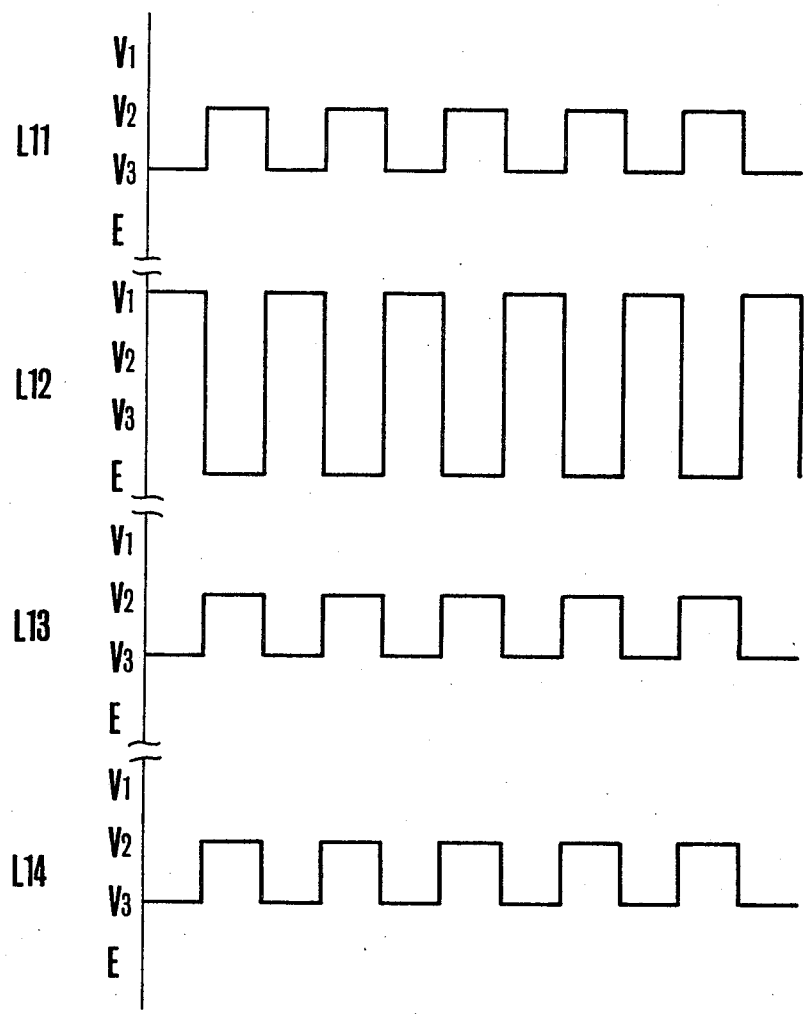
FIGS. 10(a) (b) and (c) also show timing charts of the driving circuit shown in FIG. 8 but in a different state from that shown in FIGS. 9(a)–(d).
Figure 10B:
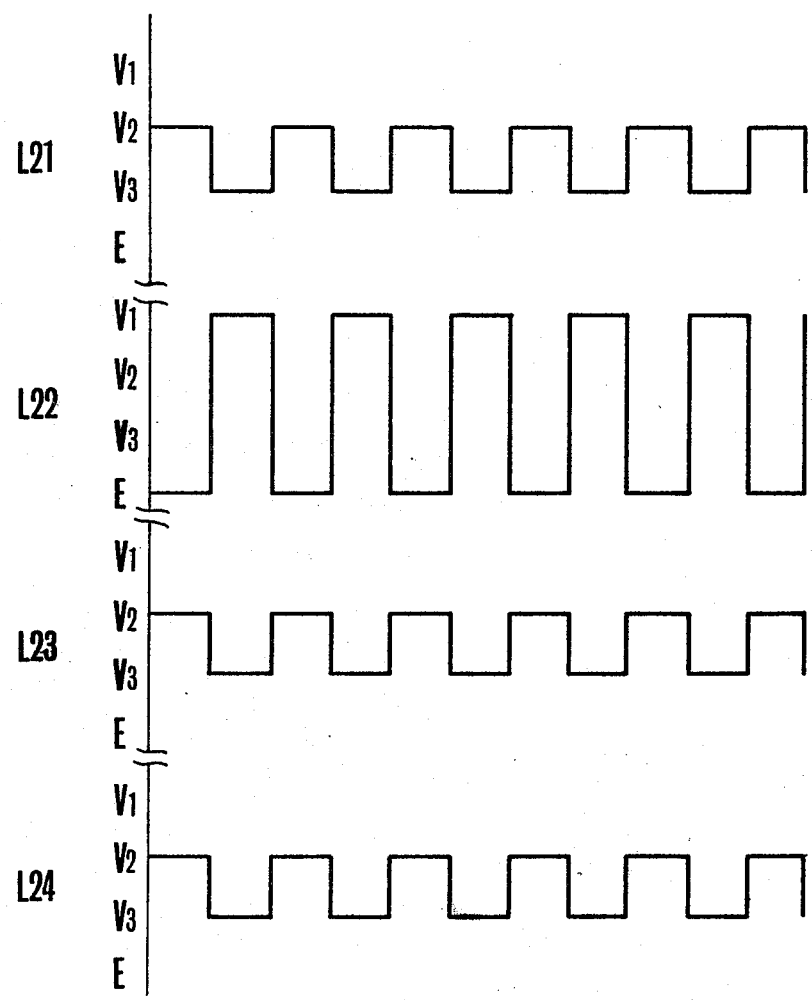

When the output state of the latch circuit 33 is varied to [0110], the level of the output 7 of the decoder becomes high, whereby the level of the outputs of OR2 and OR12 becomes high, while that of the outputs of other OR gates becomes low. Thus, out of the outputs of the inverting circuits IN1-IN4 and IN11-IN14, the level of the outputs of IN2 and IN12 becomes low, while the level of the outputs of other inverting circuits becomes high. Thus, out of the analogue switch group ASW1-ASW8, ASW2, ASW3, ASW6 and ASW8 are closed. Further, out of the analogue switch group ASW11-ASW18, ASW11, ASW14, ASW15 and ASW17 are closed. Consequently, the output pulses shown in FIG. 10(a) exist on the output lines L11, L12, L13 and L14 from the analogue switch group ASW-1-ASW8, while out of the analogue switch group ASW11-ASW18, ASW11, ASW14, ASW15 and ASW17 are closed. Thus, the output pulses shown in FIG. 10(b) exist on the output lines L21-L24 from the analogue switch group ASW11-ASW18.

Figure 10C:
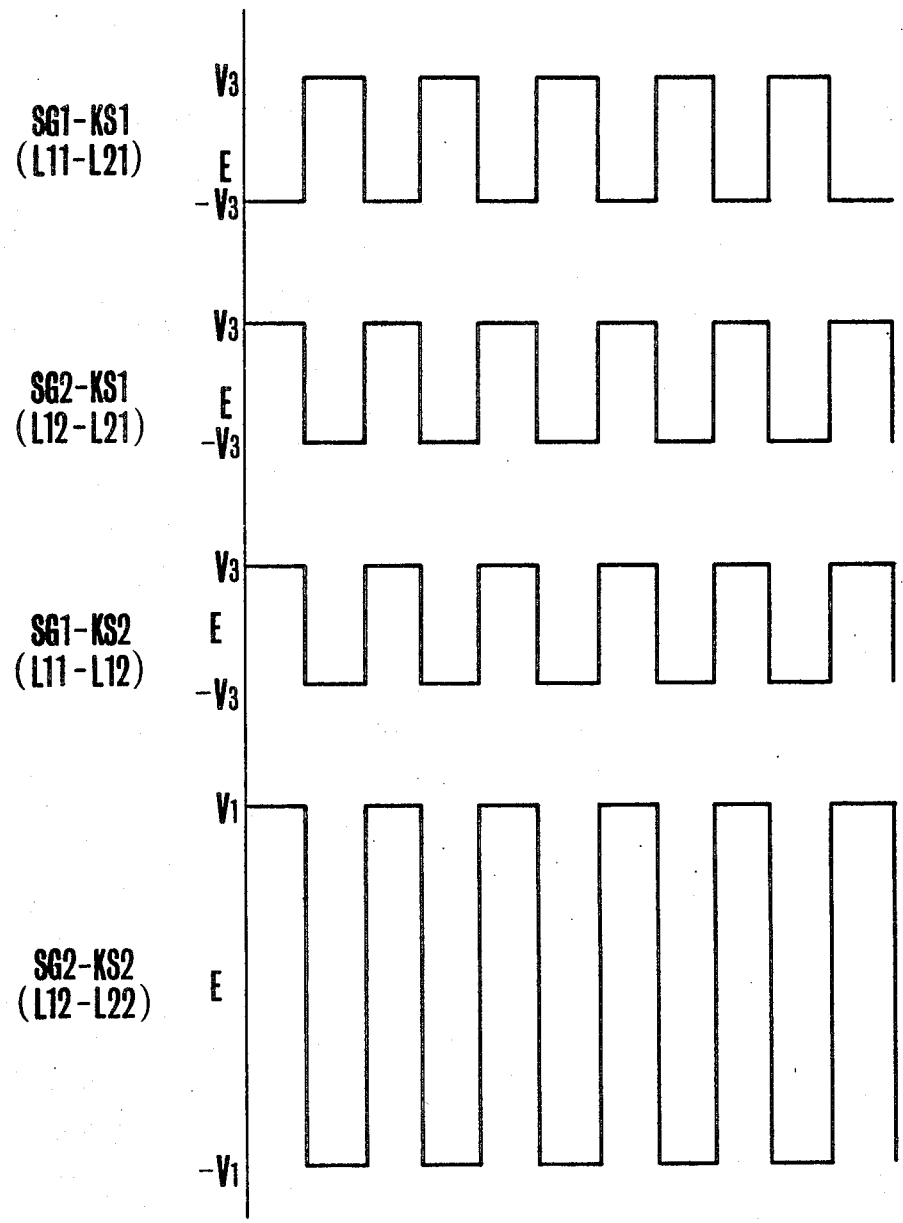

FIG. 10(c) shows the pulse wave forms between the segments of the liquid crystal display member LC in the above state. As is clear from the drawing, the effective value of only the pulse voltage between the segment electrode SG2 and the common electrode KS2 is V, while the effective value of the pulse voltages applied between other segment electrodes and the common electrode is ⅓ V. Thus, only the liquid crystal between the segment electrode SG2 and the common electrode KS2 is in the switched on state, while the liquid crystals between other segment electrodes and the common electrode KS2 are in the switched off state.

When in the same way, the output state of the latch circuit is varied into [1010], the level of only the output 10 of the decoder 35 becomes high, whereby in accordance with the same logic operation as the above only the liquid crystal between the segment electrode SG2 and the common electrode KS3 is in the switched on state.

As is clear from the above in accordance with the driving system of the present invention, pulse voltages whose phases are inverted to each other but whose p-p values are ½ Vo are applied to the common electrode and the segment electrodes corresponding to the dot picture elements to be selected, while to the common electrode and the segment electrodes corresponding to the dot picture elements not to be selected, voltages whose phases are inverted to each other but whose p-p values are 1/6 Vo, or a pulse voltage whose p-p value is ½ Vo and a pulse voltage whose p-p voltage is 1/6 Vo but whose phase is inverted to the former, are applied in such a manner that one point out of the 16 dot picture elements is selected and lit by means of 8 wires.

Below, the operation of the light measuring circuit A will be explained. When TTL light or light from outside is incident on SPC 22 for light measuring, at the output of the SPC head amplifier 21 a voltage corresponding to the logarithm of the light incident upon the SPC is produced. The output voltage is added to the ASA sensitivity information and the preset aperture value information and amplified in the adder 25 in the next step, which adder produces a negative analogue voltage. The analogue voltage is inverted and applied by means of the inverting amplifier in the next step, which amplifier produces an analogue voltage corresponding to the logarithmically compressed value of the shutter time value to be controlled. This analogue voltage is converted into a 4 bit binary code by means of the A/D converter 32 in the next step, whose latch output is produced from the latch circuit 33 and then from the decoder 35 in decimal converted code. In accordance with the decimal code output, one point of the liquid crystal display member dot system is selected and lit.

Hereby, the driving method of the dot system liquid crystal display member with a conventional static drive will be explained in accordance with FIG. 11.

Figure 11A:
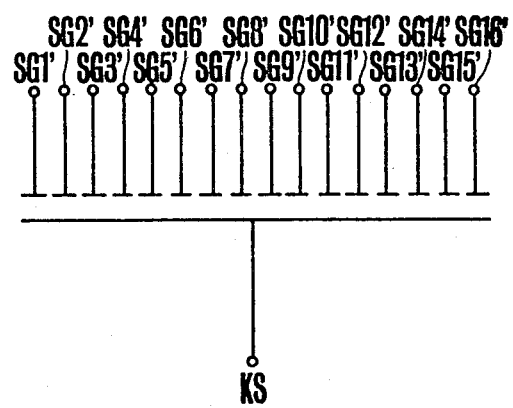
FIG. 11(a) shows the outline of a dot system liquid crystal display device in accordance with a conventional static drive.
Figure 11B:
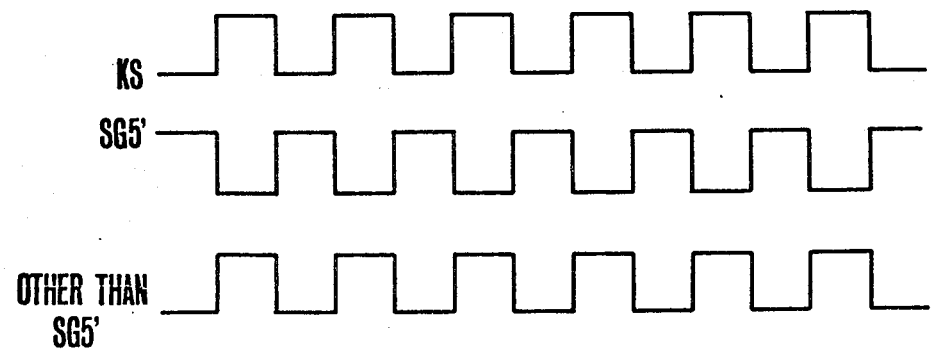
FIG. 11(b) shows a timing chart for showing the driven state of the dot system liquid system display device shown in FIG. 11(a).

In FIG. 11(a) a common transparent electrode KS is provided on one base plate of the liquid crystal cell, while divided transparent electrodes SG1'-SG16' are provided on the other base plate, whereby separate wires are connected to the divided transparent electrodes. As is clear from the drawing, in the dot system liquid crystal cell of the conventional static drive, one wire is to be connected to each of the divided transparent electrode so that 17 wires (16+1) are necessary in order to display, for example 16 dots, while in accordance with the driving system of the present invention, as is clear from FIGS. 7, 8 (=4+4) wire are sufficient, which means the number of wires can be reduced to ½ to realize economy in practice. In case, for example, the divided transparent electrode SG5' is selected to be lit in accordance with the conventional static drive system, as is shown in FIG. 11(b) the phase of the pulse voltage to be applied to the divided transparent electrode SG5' is inverted to that of the pulse voltage to be applied to the common transparent electrode KS, while the phase of the pulse voltages to be applied to other divided transparent electrodes are same as that of the pulse voltage to be applied to the common transparent electrode KS.

FIG. 12 shows the visible pattern in the view finder when the liquid crystal display member constructed as above is arranged in the optics shown in FIG. 3. In the drawing, the display A of the liquid crystal member is controlled as mentioned above, the shutter time being 1/125 sec. in this case. Windows 11b, 11c display the over-exposure alarm and the under-exposure alarm. In order to distinquish the over-exposure alarm and the under-exposure alarm from other displays, it is possible to apply one colored polarization plate so as to display the alarm in color, for example, red.

Figure 13:
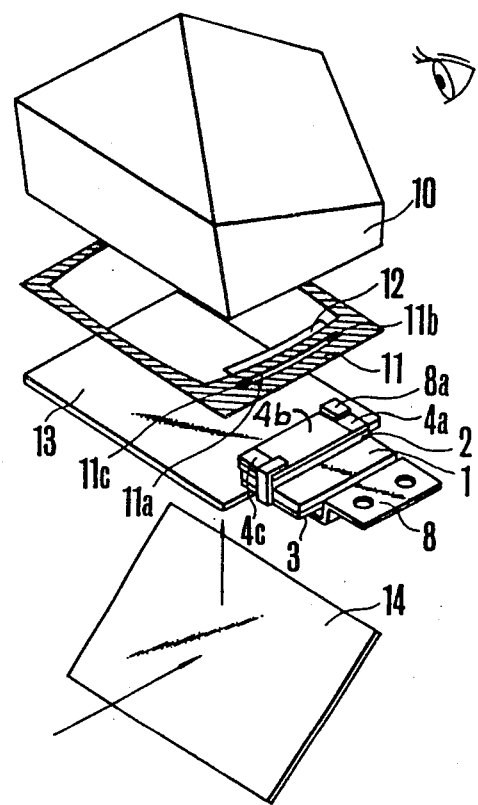
FIG. 13 shows another embodiment of the liquid crystal display device in accordance with the present embodiment in perspective view.

FIG. 13 shows the optical arrangement in this case. The desired colored polarization plates 4 (4a, 4b, 4c) are cemented, for example, on the glass base plate 2 or unified into one body before being provided on the plate 2. In order to shade the junction between 4a and 4b, and that between 4b and 4c, from the light at this time, strip-shaped light shading parts are provided between the view field masks 11a and 11b, and between parts 11a and 11c. Further, the light shading part can be provided on the display scale.

FIG. 14 shows an embodiment in which the display window 12a is constructed with the display scale plate 12, in side view. In this case, it is not necessary to provide the view field mask window part 11a.

FIG. 15 shows an embodiment in which the polarization plate and the display scale are constructed as one body. In this case, the permeability of the scale part 12a of the display scale 12 is reduced in case in polarization characteristics is given, so that the letters, the figures, the marks and so on on the scale are hard to look at in a dark place, and therefore, only the part 12b corresponding to the liquid crystal display part is given with the polarization characteristics.

FIGS. 16 and 17 show the patterns for showing other embodiments of the liquid crystal display device in accordance with present invention.

Figure 16A:
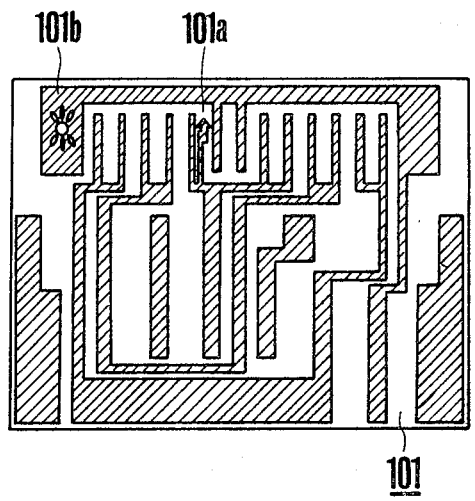
FIGS. 16(a) and (b) show another embodiment of the transparent electrode pattern of the liquid crystal display member for the liquid crystal display device in accordance with the present invention in plane view.
Figure 16B:
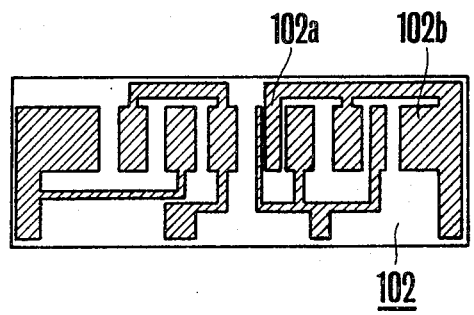

FIG. 16(a) and FIG. 16(b) show the transparent electrode patterns formed on a pair of glass base plates 101 and 102. A figure-shaped electrode part 101a consists of transparent electrode material, and a figure-shaped electrode part 101b is removed from the transparent electrode material.

Figure 17A:
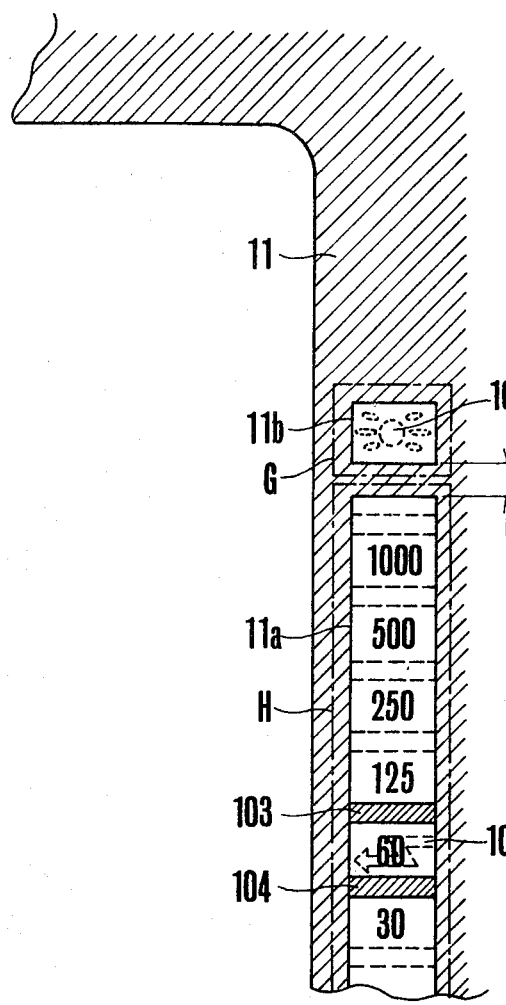
FIGS. 17(a), (b) and (c) and FIG. 18 show finder display patterns of another embodiment of the liquid crystal display device in accordance with the present invention in plane view.

As in the embodiment explained in accordance with FIGS. 1 to 6, plates 101 and 102 are arranged so as to face each other in a certain determined relative position in order to constitute a liquid crystal display member, that is, 101a faces 102a, while 101b faces 102b in such a manner that a display in the view finder as is shown in FIG. 17, is possible. FIG. 17(a) includes the above-mentioned view field mask 11, whereby the display window parts 11a and 11b, and the object window part are formed curved in such a manner that they might be observed as straight lines in the view finder as is explained in accordance with FIG. 14.

Figure 17B:
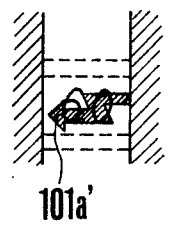

When no voltage is applied between the figure-shaped electrode part 101a of the present liquid crystal display device and the electrode part 102a facing the part 101a, their existence cannot be visually acknowledged, as is shown in a dotted line in FIG. 17(a), while when a voltage is applied between them, the liquid crystal material is excited in such a manner that, as is shown in FIG. 17(b), the display 101a in shape of the electrode 101a appears in the view finder.

In the embodiment shown in the drawing, the display electrodes are arranged at the position of the figures of 60 on the scale plate, and can be used in accordance with, for example, a display that the flash light device is ready for operation and the shutter time control circuit has been automatically changed over to the synchronization shutter time for the focal plane shutter, an alarm display that the shutter dial is to be manually set at 1/60, an alarm display that the flash light device is to be used, or a display that the flash light photography has been correctly performed. Further, it can be freely selected in accordance with whether the flash mark shaped electrode is lit or put out in some state, or whether it is continuously lit or flickered.

Figure 17C:
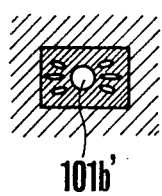

Also with the alarm display part consisting of the figure-shaped electrode 101b which is removed out of the transparent electrode material, and the electrode 102b opposed to 101b, the existence of the electrode cannot be visually recognized in the same way as the above-mentioned case as is shown in the dotted line in FIG. 17(a) when no voltage is applied, while when a voltage is applied, the liquid crystal material only between the transparent electrodes on the glass base plates is excited in such a manner that contrary to the above-mentioned case, only the circumferential part is displayed colored as is shown in FIG. 17(c). Also in this case, the flicker display system can be adopted in the same way as in the flash mark shaped display part of the above-mentioned example.

Further, contrary to the embodiments shown in the drawings up to FIG. 15, lines 103 and 104 are for displaying the scale figure (1/60 sec. in the drawing) between the two lines by simultaneously lighting the adjacent two lines. In this way, the scale figures can be clearly recognized even when the operative part of the liquid crystal and the scale figures are arranged overlapped, while in the embodiment shown in FIG. 12, the scale enters into the object view field in the view finder so as to disturb the visual recognition of the object.

In the embodiment shown in FIG. 17, the above two line display system is adopted in order to carry out the display with a flask mark shaped electrode, so that 1/60 sec. in connection with the flash light photography and 1/60 sec. in connection with the normal photography can be displayed quite independently from each other, which is quite effective. Further, it is possible that when, for example, the flash light photography is ready, the part 101a' is flickered, while at the same time, the two lines above and below the figure 250 are lit when, for example, the shutter time set on the shutter time dial is 1/250 sec. so as to clearly indicate that flash photography synchronization is impossible. Further, in case the shutter time is desired to be displayed in an AE camera with priority on aperture value, it is possible that when the flash light photography is ready the flash mark shaped electrode 101a' is flickered, whereby the display, by means of the two lines above and below the shutter time determined with the AE with the priority on aperture value, is not carried out so as to clearly indicate that the photographic mode has been automatically changed over. Further, in order to obtain clear visualization, it is recommended that the figures be black while only 60 is orange, whereby the flask mark is displayed in blue by properly selecting the liquid crystal material or the polarization plate.

The driving circuit enabling the above-mentioned various display systems can be properly designed in accordance with the driving circuit shown in FIG. 8 or disclosed in Japanese Patent Application No. Sho 54-19300, filed by the present applicant on Feb. 20, 1979, U.S. Pat. No. 4,302,086 issued Nov. 24, 1981, so that it is not necessary to give concrete examples here.

In accordance with the display by means of the liquid crystal display member of the transparent electrode material formed in a desired figure, as mentioned above, different from the display of the figures with the photographic film, the display cannot be visually recognized when it is not necessary, and only when it is necessary the desired figure can be displayed clearly so that it is quite appropriate to adopt the display particularly as an alarm display of the camera, which is needed only seldom. The patterns can be simultaneously formed on the glass base plate so that the manufacturing cost can be made economical in comparison with other manufacturing costs for adding special features.

Below, the improvement of the display effect of the display device shown in FIG. 17(a) will be explained.

The embodiment in which the polarization plates with different color display are applied to G and H, shown in dotted lines in FIG. 17(a), is explained in accordance with FIG. 13 (G corresponds to 4c, and H to 4b). In the embodiment shown in FIG. 13 the polarization plates are formed as one body, whereby it is also effective to apply the above-mentioned figure electrodes in case polarization plates with different colors at different places are used. If, for example, a polarization with red display is used at G, and that with black (or blue) display at H, the part inside of the display window part 11b is normally transparent, while only the part shown in slant lines in FIG. 17(a) becomes red when a voltage is applied so as to increase the alarm display effect, whereby the content of the alarm can be recognized by means of the figure electrodes. Therefore, when the polarization axis of the upper polarization plate is made parallel to that of the lower polarization plate only for this alarm display, the part is visually recognized normally as is shown in FIG. 17(c) when a voltage is not applied, while it is visually recognized as is shown in FIG. 17(a) when a voltage is applied, so that it is possible to obtain a flickering alarm display when a voltage is applied between both electrodes intermittently.

The following method can also be adopted as the method for coloring only the alarm display window part differently from other parts. The part G is covered with the same polarization plate as that for the part H, whereby as color means a color sheet (not the polarization plate) is secured at a position corresponding to the alarm display window 11b. The part on which the sheet is to be secured may be the upper or the lower surface of the liquid crystal display member or the upper or the lower surface of the view field mask.

In the embodiment explained in accordance with FIG. 13 the polarization plates are formed as one body but have different colors, whereby it goes without saying that separate polarization plates with desired color can be provided at the positions G and H. However, in case separate polarization plates are provided in a certain determined relation, it is recommended that they be cemented on the view field mask plate 11.

The reasons are as follows:

(1) When they are cemented on the glass base plate of the liquid crystal, the information is visually recognized through the binder, whereby there exists a danger that the display part becomes somewhat dark due to the binder layer, while because of bubbles due to inferior binding, the visuality is destroyed. On the other hand, in case they are cemented on the view field mask 11, the binder is put only on the part which is not looked at and therefore no such inconvenience takes place.

(2) When they are cemented on the glass base plate of the liquid crystal, it is necessary to exert a large force on the thin glass plate in order to obtain complete binding, whereby there is a danger that the liquid crystal display member will be mechanically damaged. On the other hand, in case they are cemented on the view field mask 11, there is no such danger.

(3) When they are cemented on the glass base plate of the liquid crystal distant from the view field mask 11, the junction is recognized through the display window 11b or 11a because the junction cannot be covered with the narrow shading part S between the alarm window part 11b and the display window part 11a in FIG. 17(a), in case the eye position deviates even a little from the optical axis of the view finder when observing through the view finder optics as is shown in FIG. 13.

The above facts can be said not only for the case when separate polarization plates are cemented in parallel, but also when the polarization plate and the color sheet are cemented in parallel or the color sheet is cemented on a part of the polarization plate.

In case various kinds of sheets are cemented on the view field mask 11, as is shown in FIG. 14, it is recommended to cement them on the lower surface of the view field mask 11. In the view finder of the camera, not only the light beam penetrates the liquid crystal display member from the beneath, but also some light beams are reflected on various parts on some light beams are incident upon the parts through the view finder window. Thus, in case they are cemented on the upper surface of the view field mask 11, due to the light beam reflected on the surface the junction can be observed, which is inconvenient and significantly influences the display effect.

In order that the display can be recognized as colorless and non-transparent when the liquid crystal is in a non-transparent state, and colored and transparent when the liquid crystal is transparent, by means of the color sheet or the color polarization plate, it is recommended to provide the color sheet or the color polarization plate on the lower surface (at 3 in FIG. 14) of the liquid crystal display member, and a neutral polarization plate on the upper surface of the liquid crystal display member or the lower surface of the view field mask 11. This is to prevent the reduction of visual variation in the non-transparent state and the transparent state of the liquid crystal due to the reflection of the light beam incident in the view finder of the camera in the same way as the above-mentioned case. Accordingly, it is added that the transparent state and the non-transparent state of the liquid crystal are dependent upon not only the application or the non-application of the voltage but also the arrangement, namely parallel arrangement or cross arrangement of the polarization axis of the upper and the lower polarization plate so that in accordance with the purpose, the voltage application control or the polarization axis arrangement control is optionally selected.

Figure 18:
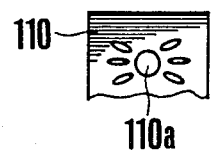

Below, another embodiment will be explained in accordance with FIG. 18.

In the embodiment shown in FIG. 14, the polarization characteristics on a part of the polarization plate is removed and a display scale is provided on the part. In accordance with the same techniques, as is shown in FIG. 18, it is possible to carry out the display in figures as is shown in FIG. 17 by means of the polarization plate on a part 110a, in FIG. 18, of which the polarization characteristic is removed. When the polarization plate 110 shown in FIG. 18 is made of, for example, a red polarization plate so as to make a liquid crystal display member, the part 110a, which has no polarization characteristics, always allows the passage of the light beam. However, parts other than 110a of plate 110 have the polarization characteristics so that the light shading state which completely prohibits the passage of light, and the color transparent state which only permits the passage of red light are changed over in accordance with the application or the non-application of the voltage upon the liquid crystal, or in accordance with the relation of the polarization axis of one polarization plate to that of the other polarization plate. In this way, it is possible that all the parts other than 110a are made red so as to carry out the alarm display by applying the voltage, for example, only in case of an alarm, while in other cases, only the part 110a is made white on the black background.

Figure 19:
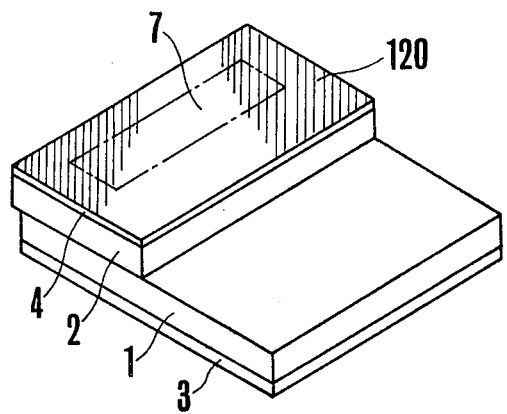
FIGS. 19 and 20 show another embodiment of the liquid crystal display member in the liquid crystal display device in accordance with the present invention in perspective view.

Below, another embodiment will be explained in accordance with FIG. 19. This relates to a counter-measure against the use of a polarized sun glass. In the drawing, one polarization plate 4 is provided with its polarization axis oblique to the display part by 45° as is shown by slant lines 120, while the polarization axis of the other polarization plate 3 is provided perpendicular (or parallel) thereto.

Considering the fact that the polarization axis of light reflected on the water surface is horizontal, the polarization axis of a polarization sun glass is made perpendicular so as to cut the reflected light. When a photographer using such a polarization sun glass looks through the view finder of the camera, and the polarization plate of the liquid crystal display member is provided along the normal direction, the polarization axis of the polarization plate is perpendicular to the polarization axis of the sun glass when the camera is set in a normal resting state or standing state in such a manner that all the display parts are dark independent of the operation of the liquid crystal matter. On the other hand, when the polarization axis is inclined by 45° as is shown in the drawing, no matter whether the photographer uses the polarization sun glass, or the camera is set in a resting or standing state, it is possible to read the display clearly.

Figure 20:
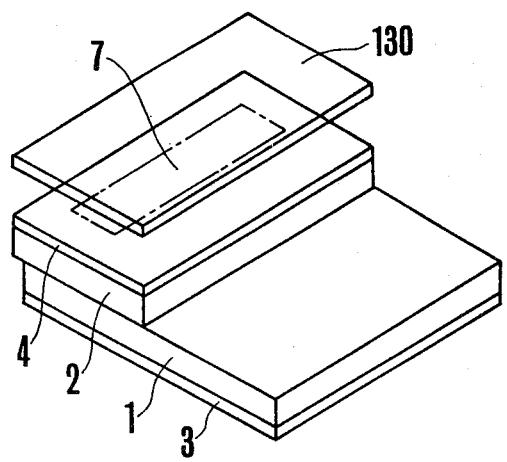

Still another embodiment of the present invention will be explained in accordance with FIG. 20. This relates to another counter-measure against the use of a polarization sun glass. FIG. 20 shows a ¼λ plate (elliptic polarization plate) 130, which can be arranged in any place between the liquid crystal display member and the eye of the photographer, for example, at the view finder window. In case the ¼λ plate 130 is provided, the part made non-transparent by means of the liquid crystal display member is observed as non-transparent (dark), while only the light polarized along a certain determined direction passes through the part made transparent, whereby the polarization is weakened by means of the ¼λ plate so that the photographer using the polarization sun glass can observe the transparent part (bright) and read the display. Generally the camera is used in a normal resting state more often than in a standing state, while it is very seldom that the camera is used in an inclined state, so that it is recommended that the members be arranged in such a manner that the display can be observed most brightly when the camera is set in the normal resting state.

Still another embodiment will be explained in accordance with FIGS. 21 and 22.

Figure 21A:
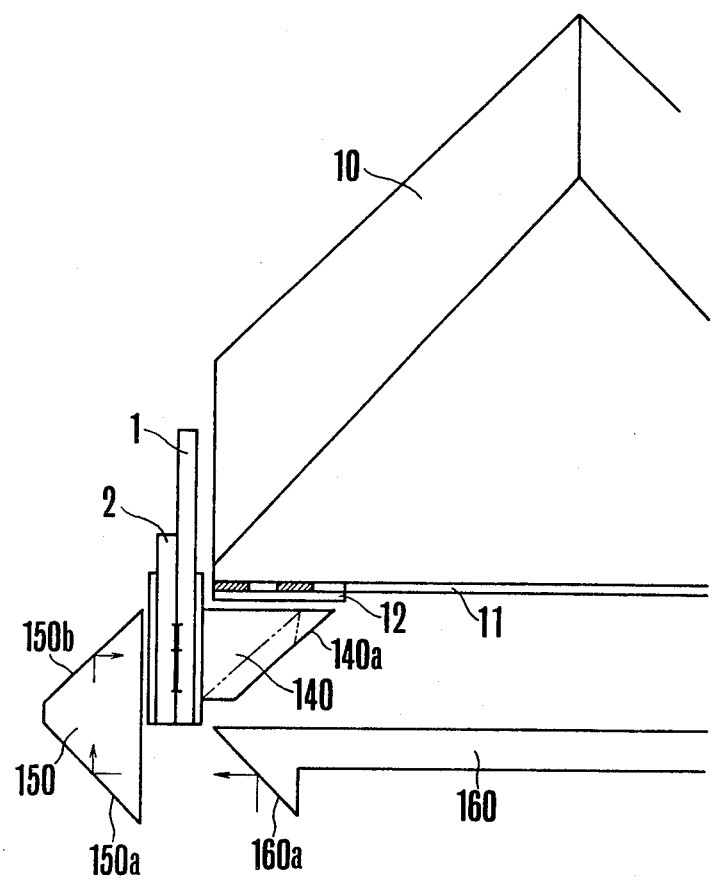
FIG. 21(a) shows an essential part of the view finder of the single lens reflex camera having a built in liquid crystal display device in another embodiment.
Figure 21B:
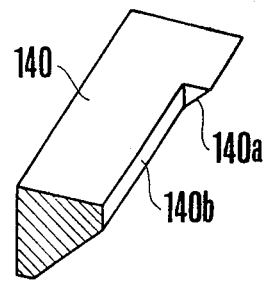
FIGS. 21(b) and (c) show the construction of a prism arranged in the device shown in FIG. 21(a) in perspective view.
Figure 21C:
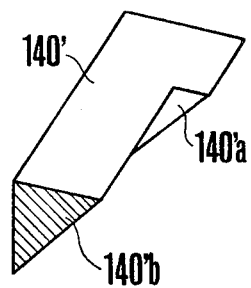
Figure 22:
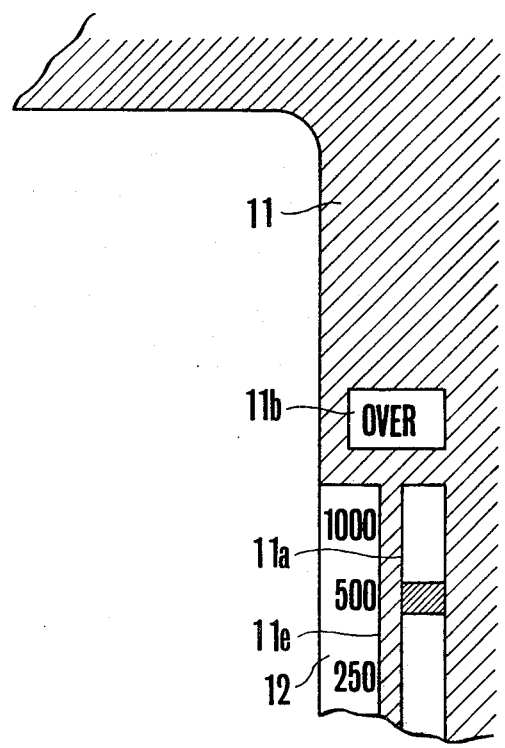
FIG. 22 shows an example of the display pattern obtained by means of the liquid crystal display device shown in FIG. 21(a) in plane view.

FIG. 21(a) shows a triangle prism 140, a reflecting prism 150 and a focusing plate 160. On plate 160 a reflecting surface 160a is formed integrally so as to reflect the light coming through the photographing lens to the left, which light is further reflected by the reflecting surfaces 150a and 150b of the reflecting prism 150 so as to illuminate the liquid crystal display member. The light passing through the liquid crystal display member is bent upwards by means of the inclined reflecting part of the triangle prism 140 so as to be visually recognized in the same way as in the above case. As shown in FIG. 21(b), the triangle prism 140 is cut at the part 140b, leaving the alarm display end 140a forming a reflecting surface. Therefore, as is shown in FIG. 21(c), it is possible to use a triangle prism 140' consisting of the alarm display inclined surface 140'a forming a reflecting surface, and an inclined surface 140'b forming a reflecting surface recessed one step from 140'a. By means of the above constructed liquid crystal display device, a display in the view finder as is shown in FIG. 22 can be obtained. With the above-mentioned construction, it is necessary that the narrow light shading strip shaped part, between the left end of the display window 11a and the right end of the notch 11e for providing the display scale, be formed curved in order that the part can be visually recognized as straight. On the other hand, it is extremely difficult for the end of part 140b of the prism 140, or that of surface 140'b of prism 140' to be formed curved, whereby it is possible to cover the end with the curved strip-shaped part defined by 11e and 11a, which is effective.

Accordingly, the part of the liquid crystal display member corresponding to the left end of the alarm display window 11b, and that corresponding to the left end of the display window 11a, lie almost on the same line on the liquid crystal display member, whereby the reflecting surface of the triangle prism 140 or 140' is formed differently for the alarm display part and the normal display part as explained above, so that the display shown in FIG. 22 is possible. As is shown in FIG. 22, the alarm display part is made large, while the scale plate remains provided outside of the object view field, whereby the alarm display effect is greater when the part is provided close to the object view field, while in the conventional design it is necessary to enlarge the glass base plates for the alarm display parts at both ends of the liquid crystal display member. However, in accordance with the present embodiment it is possible that the above effect can be realized by means of the triangle prism, whereby the liquid crystal display member is kept in a shape which is easy to manufacture.

As has been explained in detail in accordance with the embodiment, in accordance with the liquid crystal display device according to the present invention, superior liquid crystal display with remarkably high display effect can be obtained, making use of only those members which are each to manufacture, which is very profitable in the industry.

What is claimed is:

1. A liquid crystal display device for displaying photographic information together with an object image within a generally rectangular photographing view field provided by view finder optics in a camera, comprising:

display means including liquid crystal material for displaying photographic information;

holding means for holding a pentagonal prism of the camera, said display means being attached to said holding means;

mask means provided between the pentagonal prism and the display means, said mask means including a first transparent part facing a display part of the display means, a second transparent part facing the object image, and a light shading part provided between the first and the second transparent parts to shade an end part of the display means from light;

connector means for supplying power to the display means, said connector means being formed of a connector rubber;

presser means formed to apply a holding force to the connector means when said presser means is urged toward the pentagonal prism and the holding means; and spring means for urging the connector means against the display means through the presser means, said spring means being supported on the holding means.

2. A liquid crystal display device in accordance with claim 1, wherein said connector rubber comprises a conductive part and a non-conductive part which are formed together as one body.

* * * * *